US012469979B2

(12) United States Patent
Allen, Jr. et al.

(10) Patent No.: US 12,469,979 B2
(45) Date of Patent: Nov. 11, 2025

(54) ELECTROMAGNETIC METASTRUCTURES FOR RADOME OR ANTENNAE

(71) Applicant: GEORGIA TECH RESEARCH CORPORATION, Atlanta, GA (US)

(72) Inventors: Kenneth Wayne Allen, Jr., Atlanta, GA (US); Daniel J.P. Dykes, Atlanta, GA (US); Jeramy M. Marsh, Atlanta, GA (US); David R. Reid, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 70 days.

(21) Appl. No.: 18/686,134

(22) PCT Filed: Sep. 1, 2021

(86) PCT No.: PCT/US2021/048652

§ 371 (c)(1),
(2) Date: Feb. 23, 2024

(87) PCT Pub. No.: WO2023/033819

PCT Pub. Date: Mar. 9, 2023

(65) Prior Publication Data

US 2024/0372266 A1 Nov. 7, 2024

(51) Int. Cl.
*H01Q 15/00* (2006.01)
*H01Q 1/42* (2006.01)

(52) U.S. Cl.
CPC ......... *H01Q 15/0086* (2013.01); *H01Q 1/422* (2013.01)

(58) Field of Classification Search
CPC ........... H01Q 15/0006; H01Q 15/0013; H01Q 15/0026; H01Q 15/0086; H01Q 1/40; H01Q 1/405; H01Q 1/42; H01Q 1/422
See application file for complete search history.

(56) References Cited

U.S. PATENT DOCUMENTS

| | | | | |
|---|---|---|---|---|
| 11,041,936 B1 * | 6/2021 | Wall | H01Q 1/425 | |
| 11,870,147 B2 * | 1/2024 | Poulsen | H01Q 19/06 | |
| 2004/0227687 A1 * | 11/2004 | Delgado | H01Q 1/42 | 343/872 |

(Continued)

FOREIGN PATENT DOCUMENTS

WO 2016024077 A1 2/2016

OTHER PUBLICATIONS

International Search Report and Written Opinion received in PCT/US2021/048652 mailed Nov. 30, 2021.

(Continued)

*Primary Examiner* — Jason M Crawford
(74) *Attorney, Agent, or Firm* — Meunier Carlin & Curfman LLC

(57) ABSTRACT

A frequency selective structure (FSS), e.g., metamaterial, is disclosed that can be used for structural and electromagnetic (EM) purposes in a radome or antenna structure. The FSS may be used as the core dielectric to provide both mechanical rigidity and to provide an electromagnetic (EM) response that is sculpted for transmission, reflection, and/or absorption of an impinging EM wave. To this end, the FSS can facilitate dual-purpose use (or multi-purpose use).

20 Claims, 11 Drawing Sheets

(56) References Cited

U.S. PATENT DOCUMENTS

| | | | | |
|---|---|---|---|---|
| 2004/0239577 | A1* | 12/2004 | Delgado | H01Q 1/422 343/872 |
| 2005/0247471 | A1 | 11/2005 | Archambeault et al. | |
| 2008/0001843 | A1* | 1/2008 | Wu | H01Q 1/405 343/873 |
| 2011/0199281 | A1* | 8/2011 | Morton | H01Q 1/42 343/872 |
| 2014/0111400 | A1* | 4/2014 | Latrach | H01Q 15/0086 343/878 |
| 2014/0118217 | A1* | 5/2014 | Cannon | H01Q 1/425 343/872 |
| 2014/0118218 | A1* | 5/2014 | Jordan | H01Q 15/0086 343/872 |
| 2015/0255862 | A1* | 9/2015 | LoRe | H01Q 15/0006 29/601 |
| 2018/0053994 | A1* | 2/2018 | Grando | H01Q 1/281 |
| 2019/0067806 | A1* | 2/2019 | Xu | H01Q 1/422 |
| 2020/0044326 | A1* | 2/2020 | Olfert | H01Q 1/364 |
| 2020/0253096 | A1* | 8/2020 | Mcbain | H05K 9/0088 |
| 2021/0028553 | A1* | 1/2021 | Buckley | H01Q 9/0442 |
| 2024/0372266 | A1* | 11/2024 | Allen, Jr. | H01Q 1/422 |
| 2025/0038422 | A1* | 1/2025 | Ito | H01Q 15/0086 |

OTHER PUBLICATIONS

Molero, C., E. Menargues, and M. García-Vigueras. "All-metal 3-D Frequency Selective Surface with Versatile Dual-Band Polarization Conversion." IEEE Transactions on Antennas and Propagation (2020), 68 (7), pp. 5431-5441. ff10.1109/TAP.2020.2975270ff. ffhal-02871997.

Li, Bo, and Zhongxiang Shen. "Wideband 3D frequency selective rasorber." IEEE Transactions on Antennas and Propagation 62.12 (2014): 6536-6541.

Li, Bo, and Zhongxiang Shen. "Angular-stable and polarization-independent frequency selective structure with high selectivity." Applied Physics Letters 103.17 (2013): 171607.

Shen, Zhongxiang, Jiang Wang, and Bo Li. "3-D frequency selective rasorber: concept, analysis, and design." IEEE Transactions on Microwave Theory and Techniques 64.10 (2016): 3087-3096.

Zhang, Yixiong, et al. "Frequency selective rasorber with low insertion loss and dual-band absorptions using planar slotline structures." IEEE Antennas and Wireless Propagation Letters 17.4 (2018): 633-636.

* cited by examiner

ELECTROMAGNETIC METASTRUCTURES FOR RADOME OR ANTENNAE

This application is a U.S. National Stage application filed under 35 U.S.C. § 371 of PCT/US2021/048652 filed Sep. 1, 2021, which is incorporated herein by reference in its entirety.

TECHNICAL FIELD

This disclosure is directed to radome and antenna-associated structures.

BACKGROUND

Traditionally, radomes have been constructed by dielectric material stack-ups. For example, an A-sandwich radome has been constructed with two outer dielectrics and an inner core dielectric. Hybrid-radomes have been manufactured that used frequency-selective materials in the two outer dielectrics.

The first type of radome panels comprises a thin membrane wall configured with adjacent panel flanges to carry wind loads. The second type of panels comprises a solid laminate wall. The third type of panels comprises a 2-layer sandwich wall having a layer of foam primarily for thermal insulation. The fourth type of panel comprises a 3-layer sandwich foam core wall in which the core is selected for RF signal frequency and thermal insulation.

SUMMARY

A frequency selective structure (FSS), e.g., metamaterial, is disclosed that can be used for structural and electromagnetic (EM) purposes in a radome or antenna structure. The FSS may be used as the core dielectric to provide both mechanical rigidity and to provide an electromagnetic (EM) response that is sculpted for transmission, reflection, and/or absorption of an impinging EM wave. To this end, the FSS can facilitate dual-purpose use (or multi-purpose use).

In an aspect, an exemplary radome panel structure is disclosed comprising a substrate formed of a dielectric material, the substrate having a surface that forms a radome outward-facing skin for a radome; and one or more wall dielectric metastructure structures fixably coupled (using adhesives, connectors, electrical or sonic welding) to the substrate, including a first wall dielectric metastructure structure, the first wall dielectric metastructure structure having a non-parallel (e.g., perpendicular or non-perpendicular) coupling to the substrate that extends one side of the first wall dielectric metastructure structure away from the substrate, the first wall dielectric structure comprising a conductive layer having a pattern formed thereon to provide three-dimensional frequency selectivity (e.g., to generate active and/or non-linear responses) to RF waves that traverse across the radome panel structure.

In some embodiments, the instant electromagnetic metastructures can be leveraged in applications requiring frequency filtering, e.g., electromagnetic interference (EMI) mitigation through reflection bands and/or absorption bands; electromagnetic field shielding; polarization conversion; signal multiplexing; reflector-based antenna systems; Cassegrain antenna systems; sub-reflectors; impedance matching to RF sensors; among others. The instant electromagnetic metastructures can be configured for operation over frequency ranges from DC to the visible regime. Electronic components and/or phase change materials can be integrated into the electromagnetic metastructure to generate active and/or non-linear responses, e.g., as a shuttered radomes, non-reciprocal radomes, frequency tunable filters, and the like.

In some embodiments, the pattern forms electrical routing paths that connect to at least one of a magnetic composite and/or resistive film to provide the three-dimensional frequency selectivity to the RF waves.

In some embodiments, the pattern forms a resonator (e.g., comprising dipoles, squares, loops, slots shaped patterns).

In some embodiments, the radome panel structure includes at least a first side, a second side, and a third side, wherein the first side has a first set of interconnects to connect to a second radome panel structure, the second side has a second set of interconnects to connect to a third radome panel structure, and the third side has a third set of interconnects to connect to a fourth radome panel structure, and wherein the radome panel structure, the second radome panel structure, the third radome panel structure, and the fourth radome panel structure collectively form a planar array having a plane having a surface normal that is parallel to a travel direction of the RF waves.

In some embodiments, the radome panel structure further includes a fourth side, the fourth side having a fourth set of interconnects to connect to a fifth radome panel structure.

In some embodiments, the radome panel structure, the second radome panel structure, the third radome panel structure, and the fourth radome panel structure collectively define an integrated space in the radome, wherein the integrated space is filled with a material (e.g., polymer, ceramic, low-density foam) to improve the frequency selectivity characteristics or mechanical properties of the integrated space.

In some embodiments, the radome panel structure further includes a second-layer substrate formed of a dielectric material, the second-layer substrate comprising a conductive layer having a second pattern formed thereon to further provide the three-dimensional (3D) frequency selectivity to the RF waves that traverse across the radome panel structure.

In some embodiments, the radome panel structure further includes a second-layer substrate formed of a dielectric material, the second-layer substrate having a surface that is fixably coupled to the one or more wall dielectric metastructure structures, including to the first wall dielectric metastructure structure; and one or more second-layer wall dielectric metastructure structures fixably coupled (using adhesives, connectors, electrical or sonic welding) to the second-layer substrate, including a first second-layer wall dielectric metastructure structure, the first second-layer wall dielectric metastructure structure having a non-parallel (e.g., perpendicular or non-perpendicular) coupling to the second-layer substrate that extends one side of the first second-layer wall dielectric metastructure structure away from the second-substrate substrate, the first second-layer wall dielectric structure comprising a conductive layer having a third pattern formed thereon to further provide the three-dimensional frequency selectivity to the RF waves that traverses across the radome panel structure.

In some embodiments, the second-layer substrate comprises a conductive layer having a second pattern formed thereon to further provide the three-dimensional frequency selectivity to the RF waves that traverse across the radome panel structure.

In some embodiments, the pattern is configured to provide three-dimensional frequency selectivity (FSS) characteristics that reflect or polarize certain EMI waves (e.g., to reflect pre-defined EM wavelengths in one or more of an L-, S-, C-, X-, and Ka-bands).

In some embodiments, the three-dimensional frequency selectivity (FSS) characteristics are defined by a periodicity parameter of a lattice formed by the one or more wall dielectric metastructure structures.

In some embodiments, the pattern is coupled to electrical switch matrices, Schottky diodes, phase change materials, or other components to, collectively, induce an electric flow from the RF wave, wherein the first wall dielectric metastructure structure is configured to increase its reflective properties to the RF wave with the electric flow (e.g., provide additional capabilities such as a power-dependent response).

In some embodiments, the substrate is substantially flat (e.g., having a triangular-shaped substrate to form a geodesic dome).

In some embodiments, the substrate is curved (e.g., to provide a doubly-curved panels which form a spherical dome when assembled).

In some embodiments, the radome panel structure further includes a second structure comprising a dielectric material that forms an inward-facing skin for the radome structure.

In another aspect, a radome is disclosed comprising a plurality of radome panel structures, each comprising a substrate formed of a dielectric material, the substrate having a surface that forms a radome outward-facing skin for the radome; and one or more wall dielectric metastructure structures fixably coupled (using adhesives, connectors, electrical or sonic welding) to the substrate, including a first wall dielectric metastructure structure, the first wall dielectric metastructure structure having a non-parallel (e.g., perpendicular or non-perpendicular) coupling to the substrate that extends one side of the first wall dielectric metastructure structure away from the substrate, the first wall dielectric structure comprising a conductive layer having a pattern formed thereon to provide three-dimensional frequency selectivity (e.g., to generate active and/or non-linear responses) to RF waves that traverse across the radome panel structure.

In some embodiments, the radome is configured to be mounted to a vehicle (land, air, water, space vehicle) or a building.

In some embodiments, the radome is configured as a shuttered radome, non-reciprocal radome, a frequency tunable spatial filter radome, a wideband reconfigurable planar antenna radome, and a reconfigurable surface wave antennas radome.

In some embodiments, the first wall dielectric metastructure structure is fabricated as a printed circuit board or fabricated using additive manufacturing fabrication.

In another aspect, a method is disclosed of fabricating a radome, the method comprising connecting a plurality of radome panel structures to form a radome, wherein each of the plurality of radome panel structure comprises a substrate formed of a dielectric material, the substrate having a surface that forms a radome outward-facing skin for a radome; and one or more wall dielectric metastructure structures fixably coupled to the substrate, including a first wall dielectric metastructure structure, the first wall dielectric metastructure structure having a non-parallel coupling to the substrate that extends one side of the first wall dielectric metastructure structure away from the substrate, the first wall dielectric structure comprising a conductive layer having a pattern formed thereon to provide three-dimensional frequency selectivity to RF waves that traverse across the radome panel structure.

DESCRIPTION OF THE DRAWINGS

The accompanying drawings, which are incorporated in and constitute a part of this specification, illustrate embodiments and, together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Figure 1:
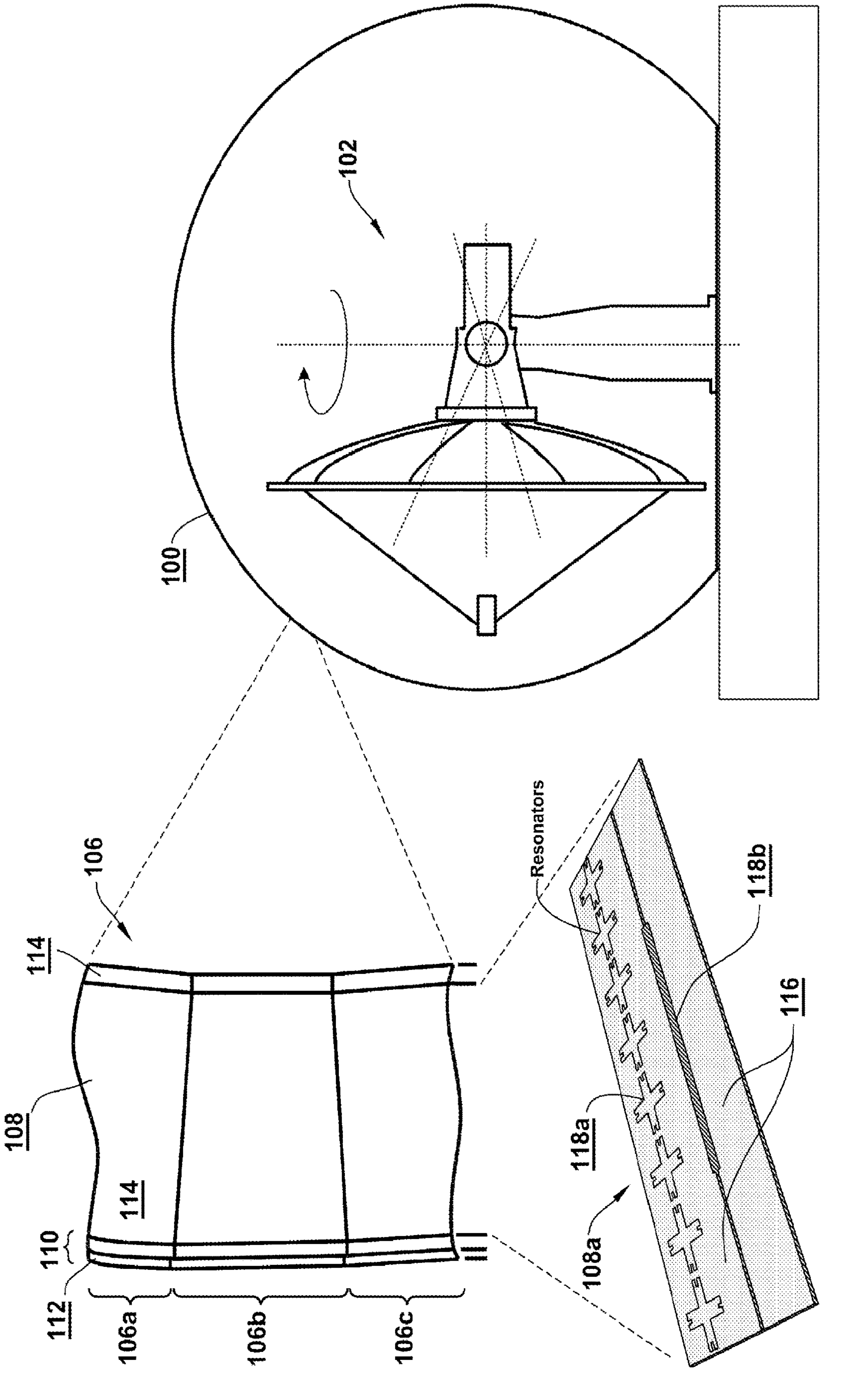
FIG. 1 shows a radome formed of a plurality of radome panel structures configured with an electromagnetic metastructure in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entireties and to the same extent as if each reference was individually incorporated by reference.

Example System

FIG. 1 shows a radome 100 that encapsulates an antenna 102. The radome 100 is formed of a plurality of radome panel structures 106 (shown as 106*a*, 106*b*, 106*c*) configured with an electromagnetic metastructure 108 (shown as 108*a*). The metastructure 108 is coupled to a substrate 110 formed of a dielectric material. The substrate 110 forms the radome outward-facing skin. In FIG. 1, substrate 110 includes a thin outer skin layer 112 and an inner layer 114, the inner layer 114 couples to the metastructure 108.

The electromagnetic metastructure 108 is formed of one or more wall dielectric structures 116. includes a conductive layer 116 (not shown) having an EM effecting pattern 118 (shown as 118*a* and 118*b*) formed thereon to beneficially provide three-dimensional frequency selectivity (e.g., to generate active and/or non-linear responses) to EM waves that traverse across the radome panel structure. The electromagnetic metastructure 108 may include electronic components and/or phase change materials that are configured to generate active and/or non-linear responses. The EM effecting pattern 118 may be formed as metallic layers on a printed circuit board. In other embodiments, the EM effecting pattern 118 is formed using conductive paint, electroless plating, etc.

The electromagnetic metastructure 108 is fixably coupled to the substrate 110 in a non-parallel manner (e.g., perpendicular or angled) that extends away from the substrate 110 to provide load-bearing structural support. The electromagnetic metastructure 108 may connect to the substrate 110 by adhesives, connectors (e.g., bolts), electrical or sonic welding.

The electromagnetic metastructure 108 forms a three-dimensional (3D) frequency selective structure (FSS), e.g., metamaterial, that can provide both electromagnetic and structural usage, amalgamating multi-physics and multi-scale demands. The frequency selective structure can be configured to reflect or transmit RF signals of certain frequencies of the electromagnetic spectrum more efficiently. This electromagnetic functionality may be integrated into the core of the metastructure and/or the outer dielectric layers, e.g., as the skin of a composite structure as further discussed in relation to FIG. 2 in a variety of configurations, e.g., A-sandwich, B-sandwich, C-sandwich, etc. In addition, the electromagnetic metastructures can provide structural components having electromagnetic responses that can provide a high technical readiness level (TRL) composite for radome.

In some embodiments, the electromagnetic metastructure 108 is configured as a composite with multi-physics/multi-scale properties with reduced SWAP-C for conformal and low-profile applications.

The electromagnetic metastructure 108 is fabricated, in some embodiments, using printed circuit board (PCB) fabrication. In other embodiments, the electromagnetic metastructure 108 is fabricated using additive manufacturing processes such as polymers, ceramics, etc.

The radome 100 and corresponding panel structures 106 may be configured for a wide variety of applications and usage such as shuttered radomes, non-reciprocal radomes, frequency tunable spatial filters, wideband reconfigurable planar antennas, reconfigurable surface wave antennas, etc., among others. In addition, the radome panel structures 106 may be made flightworthy, seaworthy, suitable for high-temperature applications, compact, and suitable for various antenna applications.

Figure 2:
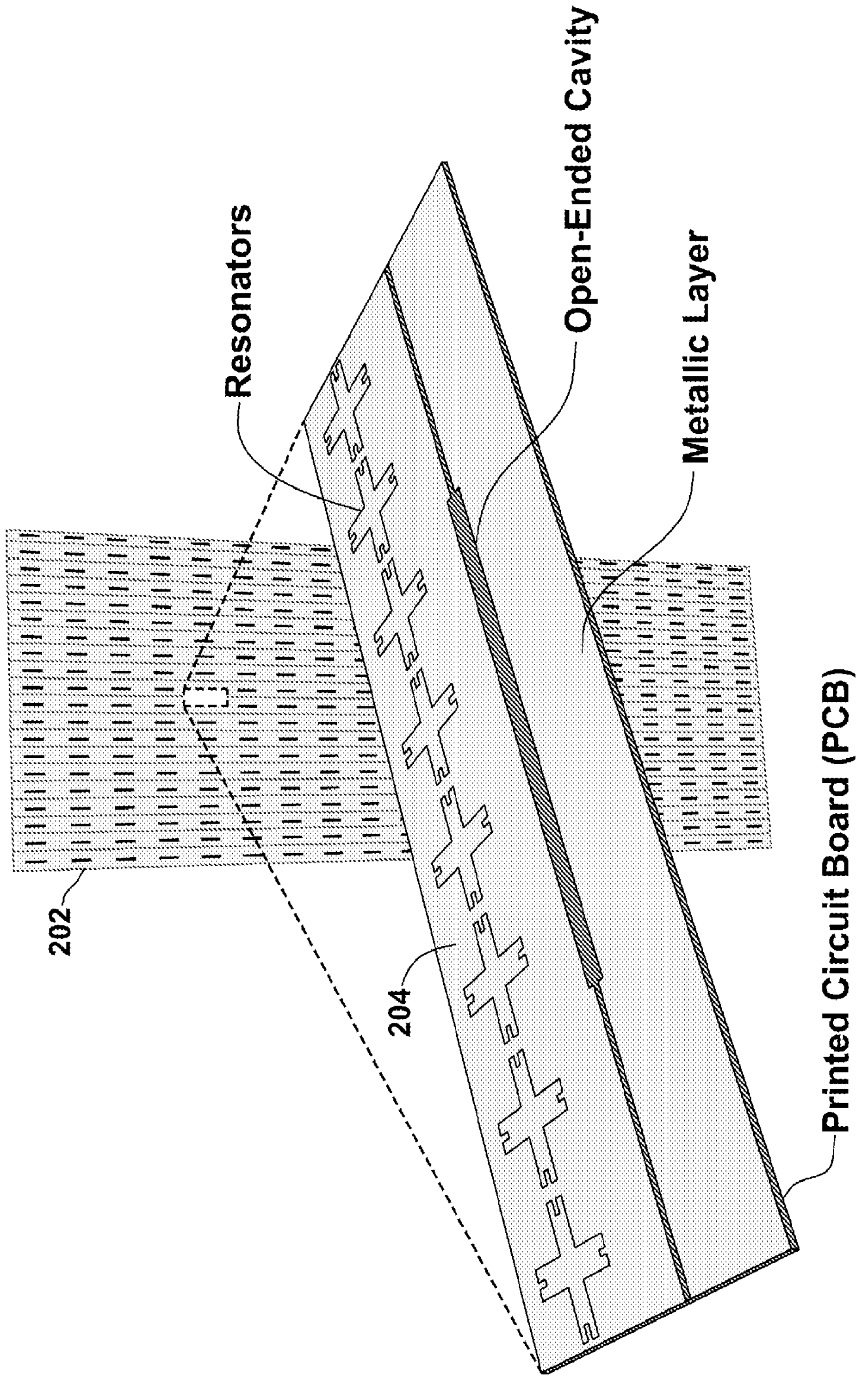
FIG. 2 shows the electromagnetic metastructure of FIG. 1 in accordance with an illustrative embodiment.

FIG. 2 shows the electromagnetic metastructure 108*a* configured for use in a radome panel structures 106 in accordance with an illustrative embodiment. The electromagnetic metastructure 108*a* is fabricated as a printed circuit board 202. Section 204 is partitioned from the printed circuit board 202. Section 204 may then be fixably coupled to the substrate 110 (not shown-see FIG. 1) to form the radome panel structures 106.

In FIG. 2, the electromagnetic metastructure 108*a* is shown configured with an open-ended cavity 206 and a series of resonators 208 (as EM effecting pattern 118) formed on a metallic layer 210 of the printed circuit board 202. In some embodiments, the EM effecting patterns are embedded in internal layers of the electromagnetic metastructure 108*a* (e.g., sandwiched between dielectric layers).

Figure 3A:
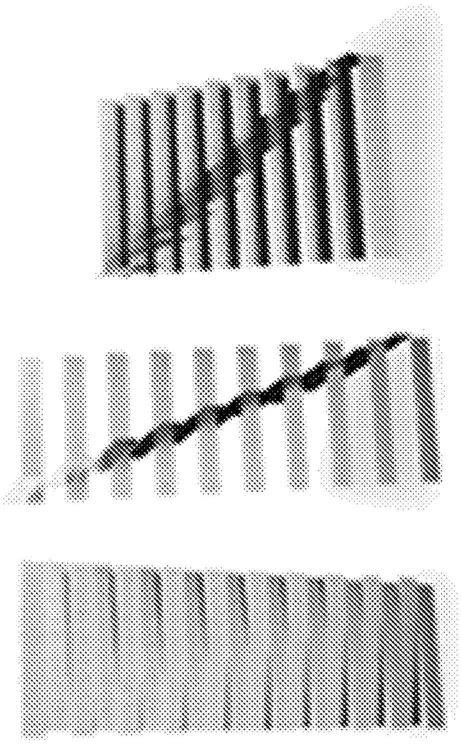
FIGS. 3A and 3B show multiple electromagnetic metastructures being coupled to one another to form a square-grid array configuration in accordance with an illustrative embodiment.
Figure 3B:
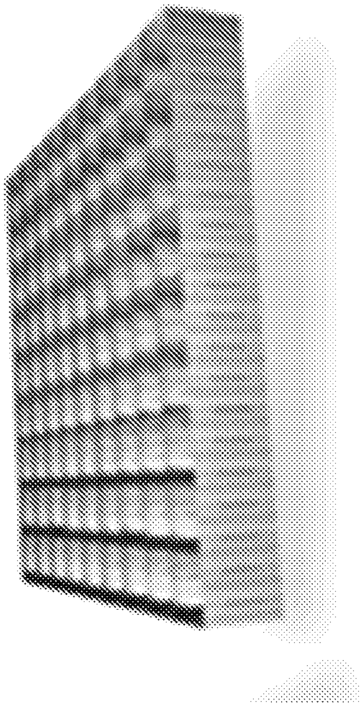

FIG. 3A shows the strips of printed circuit board material being assembled in a sequence into the 3D FSS. FIG. 3B shows multiple electromagnetic metastructures 108*a* being coupled to one another to form a square-grid array configuration. Alternatively, the array may be in a rectangular, diamond, honeycomb, or various other geometric configurations.

In some embodiments, the EM effecting patterns 118 are configured as spatial filters comprising a planar resonant array. The array can be characterized as having, or formed of, multiple electromagnetic metastructure cells. The cascade of the planar arrays through a dielectric profile can exhibit characteristics of a coupled resonators. The resonators may be configured as dipoles, squares, loops, etc.

In FIG. 3B, the multiple electromagnetic metastructures 108*a* (and thus the EM effecting patterns 118 located thereon) are arranged in a closely packed array across a plane. In some embodiments, and as shown in FIG. 3, the surface normal is perpendicular to an orientation of the electric/magnetic field vector (i.e., the expected vector once installed on the radome) of the resonant electromagnetic wave. The periodicity of the array (e.g., proximity to next resonator, cavity, or passive/active components) and the characteristic length of the resonator may be determined through EM modeling and selected based on a desired physics of the electromagnetic interactions. In some embodiments, the periodicity of the array may be configured to preserve specular reflections and avoid the onset of diffraction for the higher frequency content.

In some embodiments, e.g., for wideband applications, the array and resonators may be configured to account for the angular stability of the FSS response, which may be affected as the electrical length of the period increases for incident angles-off of normal incidence.

In some embodiments, the side walls or interior/exterior of the dielectric skins can be affixed with magnetic composites, resistive films, or other passive or active components to provide additional control of the electromagnetic response of the composite.

Figure 4:
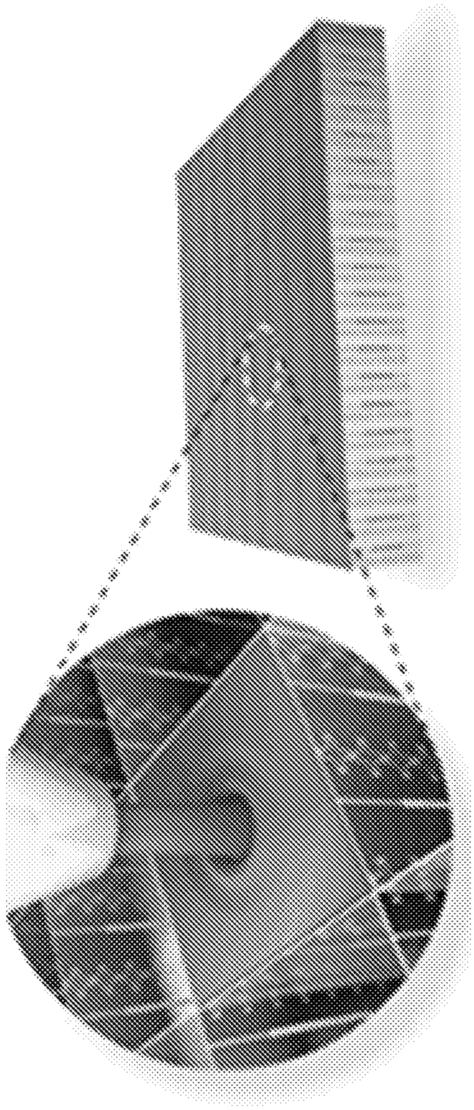
FIG. 4 shows the array of electromagnetic metastructures of FIG. 3 configured with a fill material in accordance with an illustrative embodiment.

FIG. 4 shows the array of electromagnetic metastructures 108*a* of FIG. 3 configured with a fill material in accordance with an illustrative embodiment. The fill material can provide additional load-bearing structural support and/or additionally provide FSS response. Examples of void material can include but are not limited to low-density foams, polymers (e.g., nylon 6), ceramics.

In some embodiments, the electromagnetic metastructures 108*a* are configured as a core comprising a 3D-cell. The 3D-cell electromagnetic metastructure can facilitate current paths in two or more spatial dimensions (e.g., three spatial dimensions) to provide a compact resonator in the lateral dimension. The 3D-cell electromagnetic metastructure may additionally provide a reduction in the lattice period, a stabler angular response, and/or a suppression of diffractive effects. Indeed, the 3D-cell electromagnetic metastructure (also referred to herein as a 3D core) may serve as a load-bearing structural component for a composite and also for FSS response (e.g., to improve electromagnetic performance such as bandwidth and angular stability).

In some embodiments, the electromagnetic metastructure 108*a* is configured as a core comprising a 2D frequency selective structure (2D-FSS). Multiple 2D FSSs can be integrated into the outer dielectric of the electromagnetic metastructure to provide additional effects, resulting in a hybrid EM structure with 2D and 3D unit cells. The hybrid EM structure is a load-bearing structural component for a composite and also for FSS response.

Figure 5:
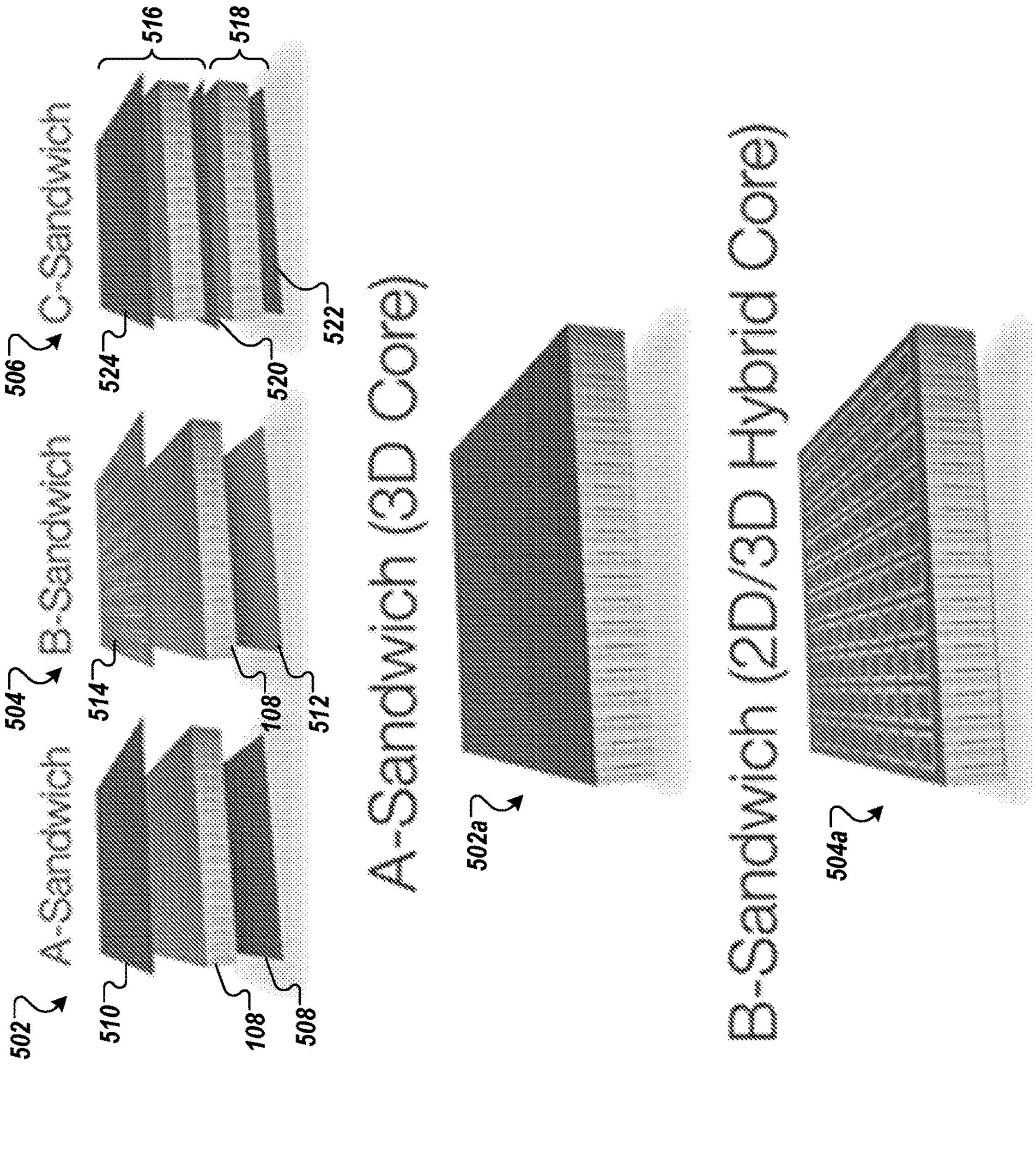
FIG. 5 shows example radome panel structures, or a portion thereof, configured with electromagnetic metastructures in accordance with an illustrative embodiment.

FIG. 5 shows example radome panel structures 106, or a portion thereof, configured with electromagnetic metastructures in accordance with an illustrative embodiment. In FIG. 5, the radome panel structures 106 are configured as planar panels. Radome panel structures 106 may be curved, as shown in FIG. 1.

In FIG. 5, the radome panel structures 106 are shown configured in an A-sandwich configuration panel (502), a B-sandwich configuration panel (504), and a C-sandwich configuration panel (506). The panels may be filled as shown in panels 502*a* and 504*a*. Indeed, the radome panel structures can form a hybrid combination with traditional 3D structures to provide additional control over the electromagnetic properties of the radome The A-sandwich configuration panel (502) comprises the electromagnetic metastructures 108 as the core to the panel structure 106. The electromagnetic metastructures 108 are coupled to an inner dielectric skin 508 and an outer dielectric skin 510.

The solid A-sandwich configuration (502*a*) may be configured with a fill material discussed herein to provide a 3D core.

The B-sandwich configuration panel (504) comprises the electromagnetic metastructures 108 as the core to the panel structure 106. The electromagnetic metastructures 108 are coupled to an inner electromagnetic metastructure 512 and an outer electromagnetic metastructure skin 514 to form a 2D structure. The sandwich configuration (504) is made of an array of 3D-cell electromagnetic metastructures.

The solid B-sandwich configuration panel (504*a*) may be configured with a fill material to provide a 2D/3D hybrid core. The solid B-sandwich configuration panel (504*a*) may be stacked to form 3D hybrid cores as well.

The C-sandwich configuration panel (506) comprises two or more sets of electromagnetic metastructures 108 as corresponding sets of cores to the panel structure 106. Each layer 516, 518 is delineated by a dielectric layer 520 and covered by an inner dielectric skin 522 and an outer dielectric skin 524. Layer 520 and dielectric skins 522, 524 may be substituted with electromagnetic metastructures in some embodiment.

Example Application and Simulation Results—Subreflector

The exemplary electromagnetic metastructure comprises, in some embodiments, FSSs designed to sculpt the frequency response such that certain frequencies are reflected and/or transmitted efficiently for various radio frequency (RF) bands.

Figure 6:
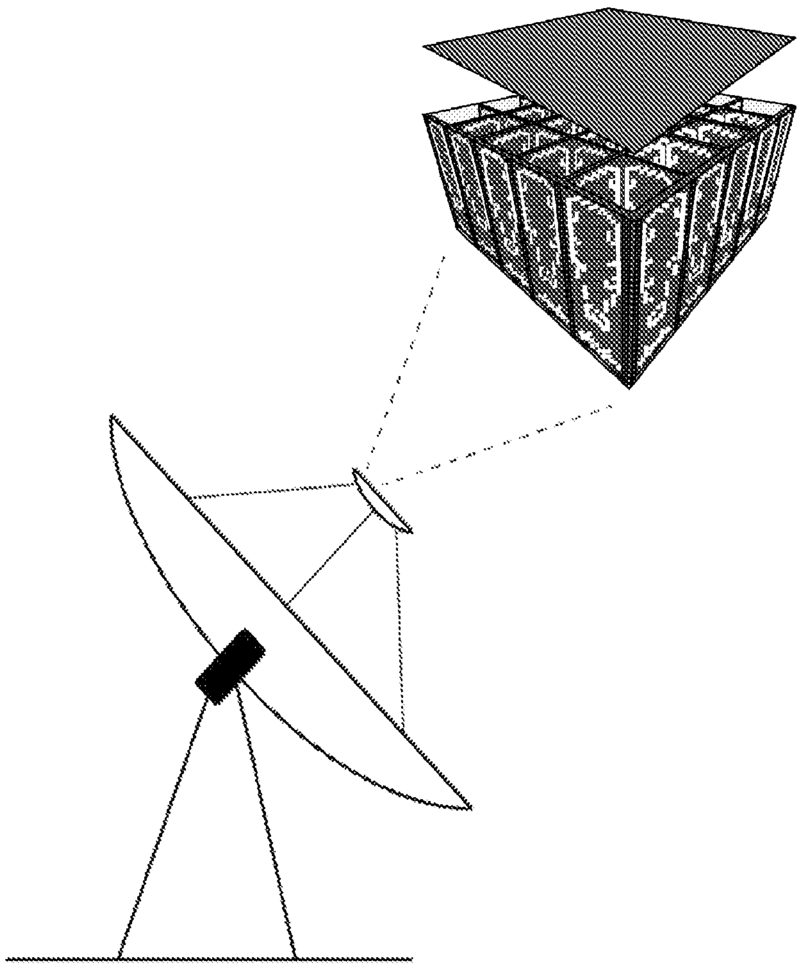
FIG. 6 shows a Cassegrain antenna configured with integrated FSS as a subreflector, to reflect specific RF bands, e.g., X- and Ka-bands, to the main reflector.

FIG. 6 shows a Cassegrain antenna configured with integrated FSS as a subreflector to reflect specific RF bands, e.g., X- and Ka-bands, to the main reflector. In addition to reflecting RF signals, the FSS may allow for other RF signals to be transmitted directly to the main reflector, which ultimately reflects all of the signals. This electromagnetic functionality can be integrated into the core of the metastructure.

Figure 7A:
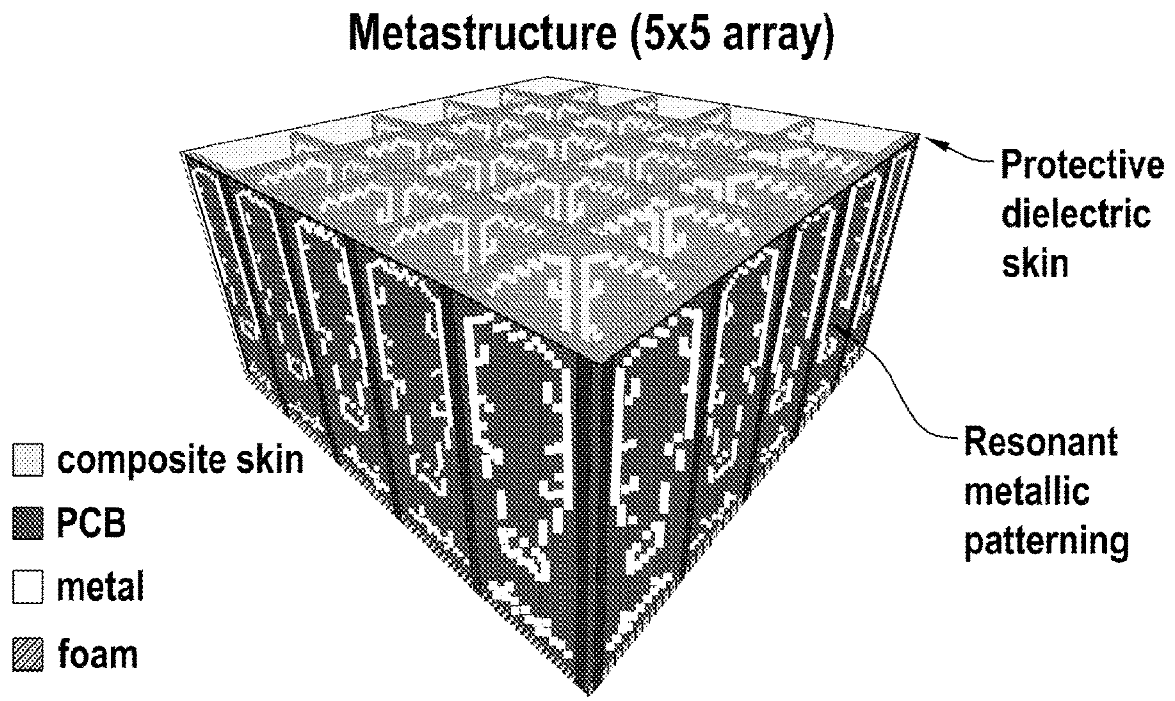
FIG. 7A shows an array of a 3D FSS core unit cell to form a metastructure panel in accordance with an illustrative embodiment.
Figure 7B:
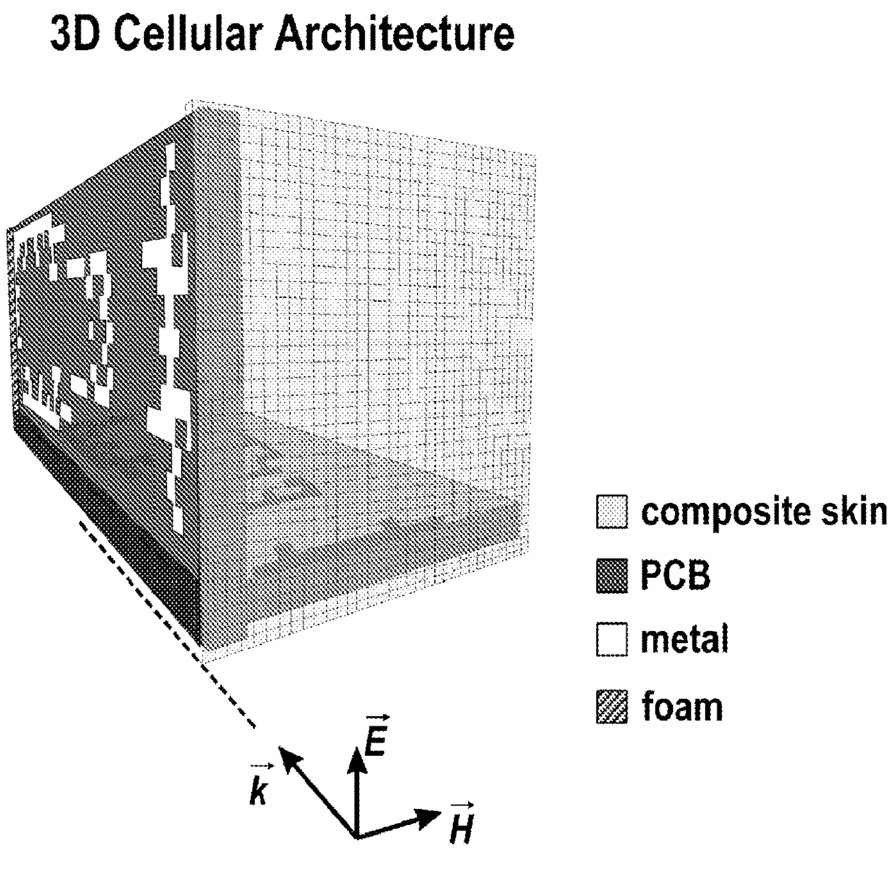
FIG. 7B shows a 3D FSS core unit cell of the array of FIG. 7A in accordance with an illustrative embodiment.

FIG. 7A shows an array (5×5 array) of the 3D FSS core unit cell to form a metastructure panel. FIG. 7B shows a 3D FSS core unit cell of the array of FIG. 7A.

The metamaterial core of the three-dimensional frequency selective structure, metamaterial of FIGS. 7A and 7B comprises an interlocking lattice of printed circuit boards (PCBs), specifically R4003C, with copper patterning on the sidewalls of the egg-crate structure, which is filled with a low-density closed-cell foam material and skinned with FR4. That material selection was notional for the design of the electromagnetic metastructure, and the response (e.g., mechanical, thermal, electromagnetic) could be re-tuned to adapt to other constituent materials.

The metastructure structural integrity may be provided by the resulting composite synthesized by the combination of the egg-crate lattice and outer skin, similar to an a-sandwich radome. The electromagnetic response is diverse with multiple transmission poles and zeros.

The electromagnetic metastructure of FIG. 7A expands beyond traditional PCB fabrication approaches by leveraging additive manufacturing (AM) techniques such as stereolithography (SLA) to generate the underlying features that could then be plated (e.g., conductive paint, electroless plating, etc.) with a conductive material. Other PCB and wired structures may be used. In some embodiments, the cores are fabricated from 3D printing technology.

FSSs are spatial filters that can be configured for a variety of applications ranging from electromagnetic interference mitigation (EMI) to subreflectors. These spatial filters may be constructed by cascades of planar resonant arrays, as discussed in relation to FIG. 3. The cascade of planar arrays through a dielectric profile can be considered as coupled resonators. The resonators are generally dipoles, squares, loops, etc., and are arranged in closely packed arrays across a plane where the surface normal is perpendicular to the orientation of the electric/magnetic field vector of the resonant electromagnetic wave. Ultimately, the physics for planar elements leads to a configuration where the characteristic length of the resonator dictates the periodicity of the array. The period of the array may impact the ability to multiplex spectrally separated signals due to the onset of diffraction for the higher frequency content. Further, the angular stability of the FSS response may be degraded as the electrical distance of the period is increased. A more suitable unit cell architecture may be required for applications where the RF signals being multiplexed require spectrally separated responses over decades of bandwidth, e.g., S to Ka bands.

Indeed, the instant 3D FSS metamaterial core may be used to facilitate a reduced period for the array which can be used to facilitate the efficient multiplexing of RF signals over spectral bands separated in over a decade of bandwidth for subreflector applications.

Figure 8:
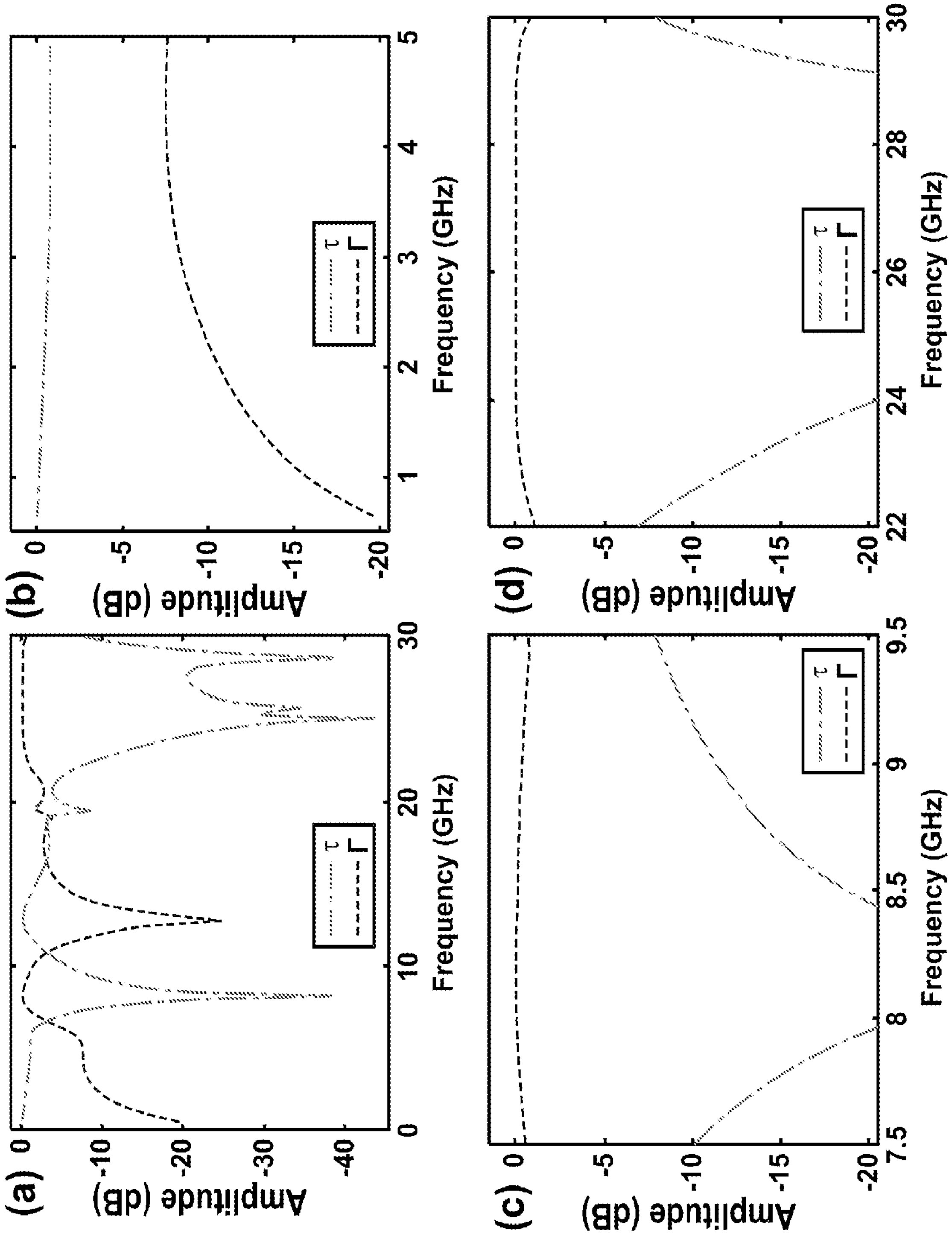
FIG. 8 shows simulation results of an example frequency response for a metamaterial core of FIG. 7A in accordance with an illustrative embodiment.

FIG. 8, plots A-D show an example frequency response for a metamaterial core comprising a three-dimensional frequency selective structure, metamaterial. Specifically, FIG. 8, plot A shows the transmission and reflection amplitude response over a wideband of frequencies for a three-dimensional frequency selective structure, metamaterial. FIG. 8, plot B shows the same response of FIG. 8, plot A at the L-, S-, C-band low insertion loss passband for the sub-reflector. FIG. 8, plot C shows the same response of FIG. 8, plot A for the X-band reflection band. FIG. 8, plot D shows the same response of FIG. 8, plot A for the Ka-band reflection band. The X-band and Ka-band of FIGS. 8, plot C and 8, plot D are below the C-band cutoff of FIG. 8, plot B. The structure was modeled within a 150-mil period of the core to ensure no higher-order spatial harmonics being generated up to 40 GHz. In the simulation, the metamaterial core was modeled to be 380-mil thick with the structural skins, and the total electromagnetic metastructure has a thickness of 390-mils to provide a low-profile structure.

It can be observed that the symmetry of the metastructure core provides an inherent dual-polarized electromagnetic response. Furthermore, the tight packing of the metamaterial core can lead to a stable angular response for both the transverse electric (TE) and transverse magnetic (TM) polarization states.

Radome Applications

Radomes are structures that encompass electromagnetic devices, such as RF antennas, to protect them from the operational environment, e.g., rain, wind, snow, ice, sand, etc. Beyond the elements, the radome can be used to protect the electromagnetic device from the electromagnetic environment, e.g., out of band rejection for electromagnetic interference mitigation, shuttered radomes to protect from high-power sources, etc. In addition, radome generally does not degrade the electromagnetic performance of the device.

Figure 9A:
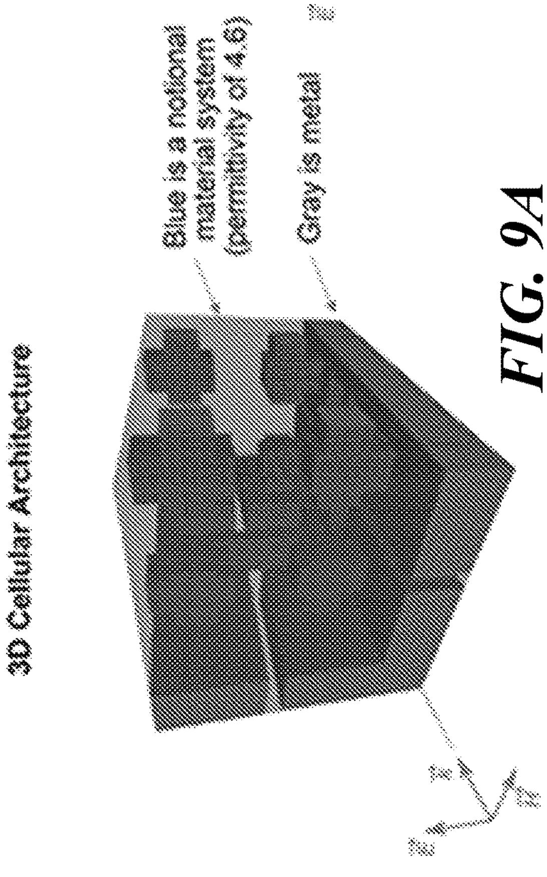
FIG. 9A shows an exemplary electromagnetic metastructure configured as a 3D unit cell having a contiguous metal FSS in accordance with an illustrative embodiment.
Figure 9B:
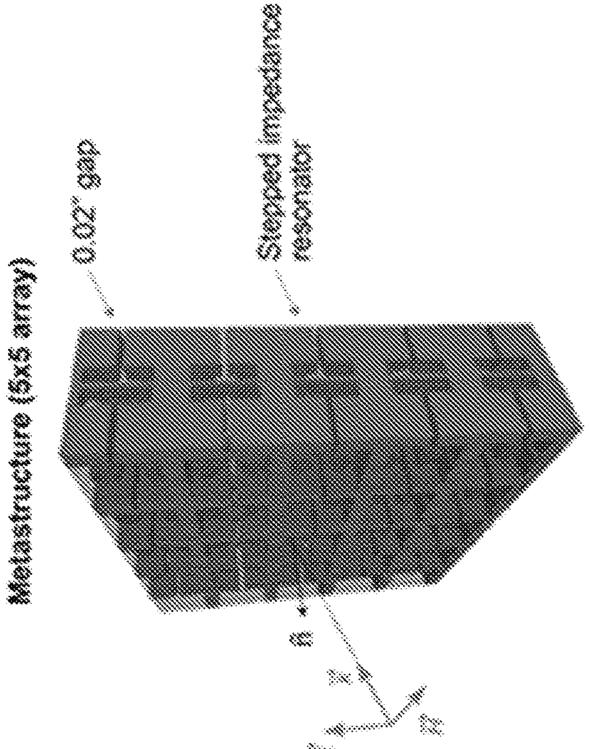
FIG. 9B shows an array of the 3D unit cell of FIG. 9A to form a metastructure in accordance with an illustrative embodiment.
Figure 9C:
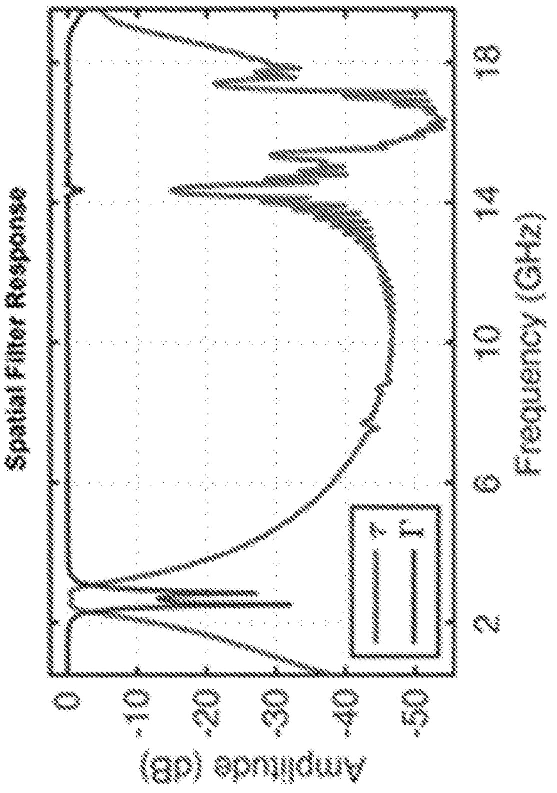
FIG. 9C shows the transmission (T) and reflection (T) properties of the electromagnetic metastructure of FIGS. 9A and 9B in accordance with an illustrative embodiment.

FIG. 9A shows a simulation model of an exemplary electromagnetic metastructure configured as a 3D unit cell having a contiguous metal FSS. FIG. 9B shows an array of the 3D unit cell of FIG. 9A to form a metastructure. The electromagnetic metastructure of FIG. 9A can serve as a free-standing structure and is filled with custom material systems. FIG. 9C shows the transmission (T) and reflection (I) properties of the electromagnetic metastructure of FIGS. 9A and 9B.

As discussed above, the electromagnetic metastructure can be plated with conductive paint, electroless plating, or other conductive material or patterning. FIG. 9A shows the unit cell fabricated with stepped impedance resonators on the sidewalls of the metastructure unit cell sidewalls and more traditional 2D resonators embedded in the material system. The example of FIG. 9A provides a material system with a notional low loss dielectric with a permittivity of 4.6.

The electromagnetic metastructure can be tuned by altering the geometrical parameters of the resonators and dielectric/magnetic properties of the material system. FIG. 9C shows the spatial filter response of the electromagnetic metastructure of FIG. 9B. In FIG. 9C, the filter response has a tight passband at S-band centered at 2.75 GHz with a reflection band below the passband and a wideband reflection band above the passband. The material system, e.g., polymer, ceramic, etc., provides the structural/thermal stability of the electromagnetic metastructure. To highlight the flexibility at the design stage of the electromagnetic metastructure, the geometrical parameters of the resonators were tuned to tailor the electromagnetic response.

Figure 10:
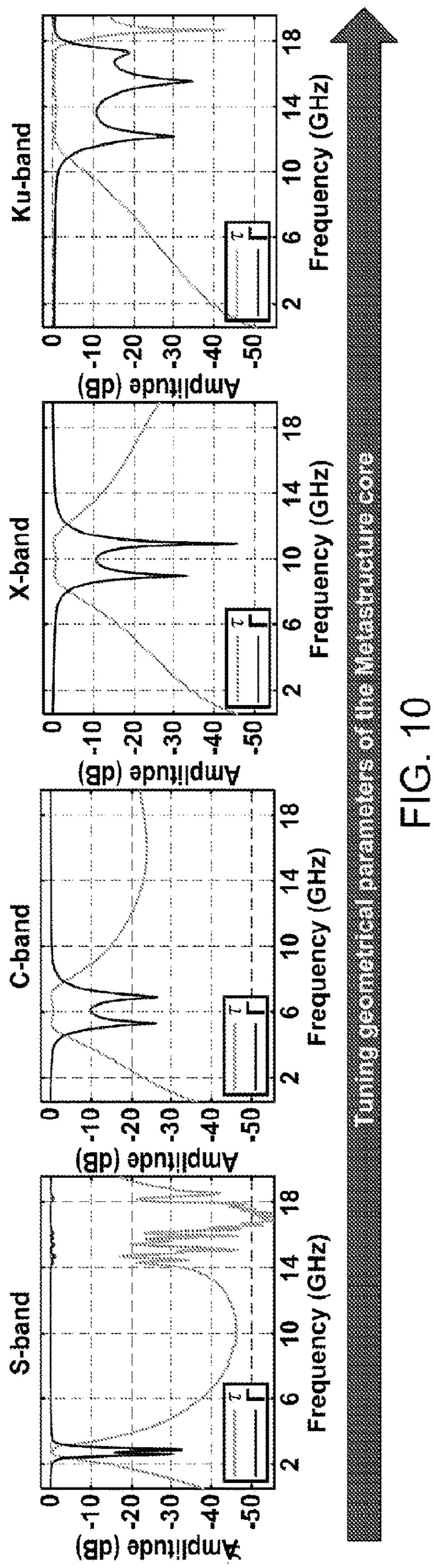
FIG. 10 shows transmission poles characteristics at S-, C-, X-, and Ku-band for the electromagnetic metastructure of FIGS. 9A and 9B.

FIG. 10 shows transmission poles characteristics at S-, C-, X-, and Ku-band for the electromagnetic metastructure of FIGS. 9A and 9B. In FIG. 10, transmission poles are shown generated at S-, C-, X-, and Ku-band with appreciable bandwidth and significant out of band rejection. The filter response may be suitable to protect electromagnetic devices.

In some embodiments, the radome may be concealed from a congested/harsh electromagnetic environment, and the lattice spacing of the electromagnetic metastructure core may be tightly packed to ensure no diffractive effects below 18 GHz. The example electromagnetic metastructure designs of FIG. 10 are notional but may be tuned to different portions of the electromagnetic spectrum and could leverage different material systems. The passbands in these designs, formed by two or three transmission poles, may generate a low insertion loss radome solution synthesized with customizable material systems that extend the material choice options beyond the traditional printed circuit board materials.

Versatile Anisotropic Responses—Polarizers

Figure 11:
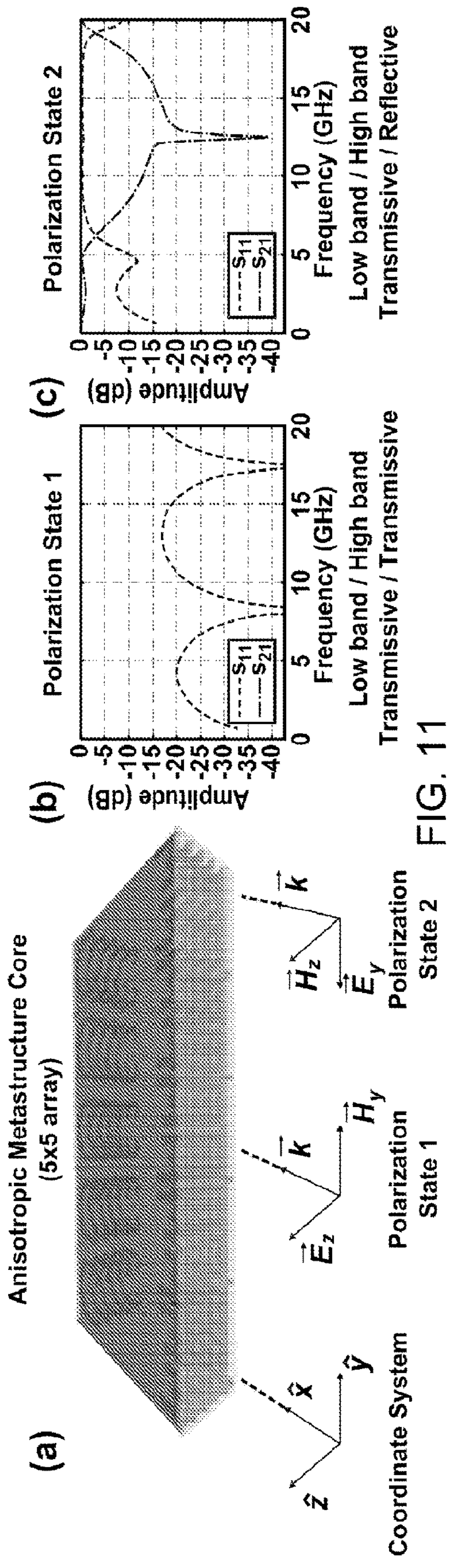
FIG. 11 shows (i) an anisotropic electromagnetic metastructure core configured with an electromagnetic response that is engineered for polarization diversity transmission and (ii) its (S21) and reflection (S11) spectra for a first polarization state and second polarization state.

FIG. 11 shows an anisotropic electromagnetic metastructure core configured with an electromagnetic response that is engineered for polarization diversity. FIG. 11 also shows a transmission (S21) and reflection (S11) spectra for a first polarization state (e.g., state "1") and second polarization state (e.g., state "2") for the core.

In FIG. 11, the anisotropy emerges from the physical asymmetries of the design. Specifically, the periodicity of the metastructure lattice was selected to be rectangular (250 mils×50 mils in the y-z plane, respectively) in which the metallic patterning on the x-y plane generates a strong reflection band from 10-18 GHz for $\vec{E}_y$ polarized EM waves but is transparent over the same band for $\vec{E}_z$ polarized waves. The k-vector is aligned with x for both polarization states (FIG. 11). However, a passband was engineered for both polarization states below 5 GHz, as shown in in the two plots of FIG. 11. Thus, an A-sandwich construction panel with a metastructure core with an anisotropic array lattice can generate a spectrally tuned polarizer in which the RF response is isotropic at low frequencies (i.e., below 5 GHz) but exhibits a strong polarization response (i.e., extinction of ~ 10-20 dB) at higher frequencies (i.e., 10-18 GHz). This particular response may be suitable for a low-pass transmission band for arbitrary polarization with a strong wideband linear polarization response at the high band. It is contemplated that the electromagnetic metastructure can be configured for other anisotropic responses

Electromagnetic Interference Mitigation

Figure 12:
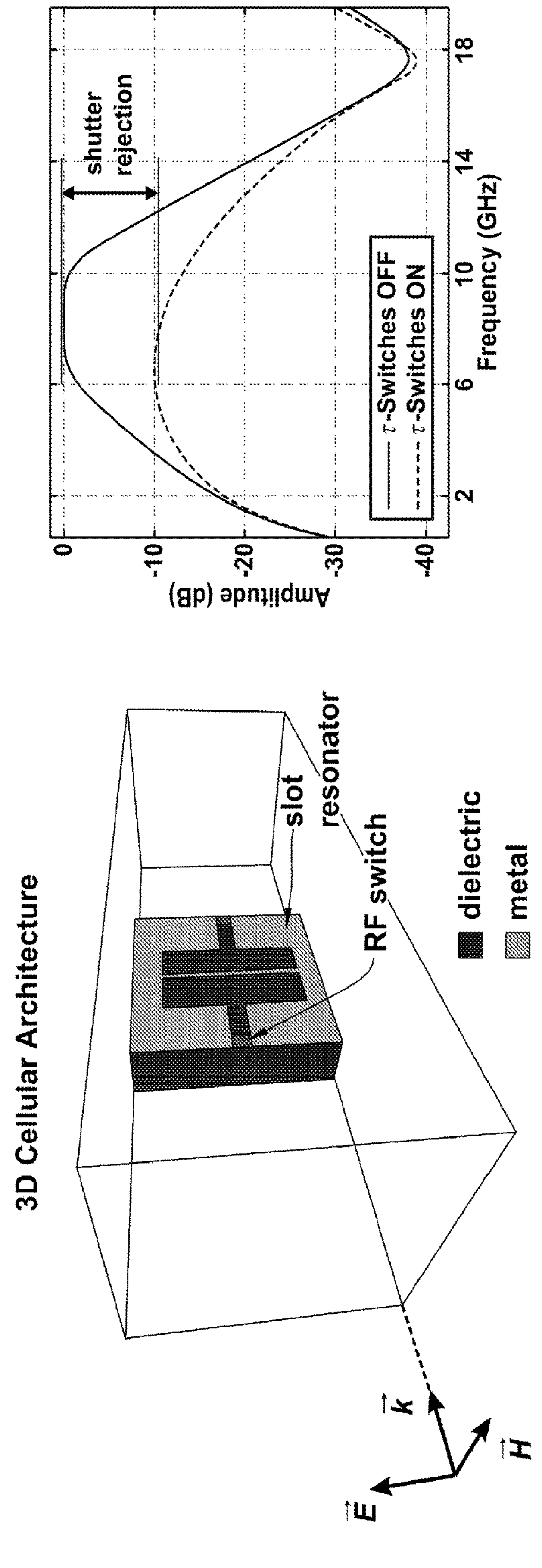
FIG. 12 shows an electromagnetic metastructure core comprising a slot resonator and its transmission response in accordance with an illustrative embodiment.

Extending this concept further, electronic components and/or phase change materials may be integrated into the metastructure to provide active/non-linear responses that can provide additional electromagnetic interference mitigation in-band. FIG. 12 shows an electromagnetic metastructure core comprising a slot resonator disposed on the sidewall of the metastructure. The slot resonator includes an RF switch that is located across the slot line to provide a two-state metastructure. The electromagnetic metastructure core of FIG. 12 may be used for shuttered radome, for example. The plot of FIG. 12 shows the transmission response of the metastructure for each of the two states.

As shown in the plot of FIG. 12, in the "OFF" state, the stepped impedance resonator can provide a low insertion loss transmission peak from 6-10 GHz. This could provide a reasonable radome response for parts of C- and X-band for sensitive RF sensors. Once the switch is toggled into the "ON" state, the slot line is shorted, resulting in an impedance mismatch for the metastructure. The impedance mismatch can cause the transmission window to close to provide a 10 dB+rejection/isolation operation. The use of switches, as shown in FIG. 12, can be extended, for example, to a dual-polarized metastructure with significantly enhanced rejection.

More elaborate switch matrices may be integrated into the unit cell to generate a library of possible responses for a versatile, reconfigurable metastructure with 100 s or 1000 s of operating states. The metastructure may employ an external bias to provide the electronic reconfiguration of the electromagnetic response. In some embodiments, Schottky diodes may be integrated to provide a power-dependent response. That is, as the impinging field strength increases, the state of the diode may be altered. The metastructure thus may be tuned such that the power-dependent response protects sensitive RF devices behind the radome metastructure.

Further, phase change materials are integrated, in some embodiments, into the unit cell such that the thermal profile of the environment altered the electromagnetic response of the metastructure. In this way, the metastructure (e.g., antenna, radome, etc.) may be manufactured with material systems such that the electromagnetic response may be tuned to operate at the temperature of the application.

Example Connectivity Assemblies and Radomes

Figure 13:
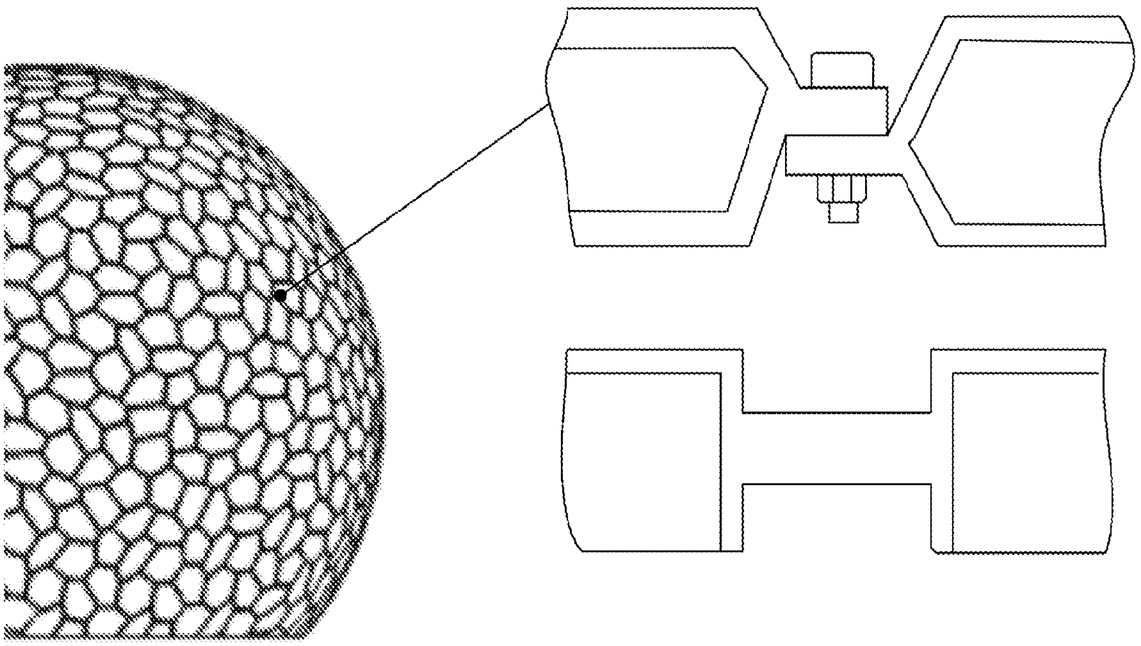
FIG. 13 shows an example connectivity assembly of the radome panel structures 106 comprising the electromagnetic metastructure cores in accordance with an illustrative embodiment.

FIG. 13 shows example connectivity assemblies of the radome panel structures 106 comprising the electromagnetic metastructure cores in accordance with an illustrative embodiment. In some embodiments, the radome panel structures 106 include mounting assemblies that allow for bolts or connectors to be used. In other embodiments, the radome panel structures 106 include a dielectric joint.

Figure 14:
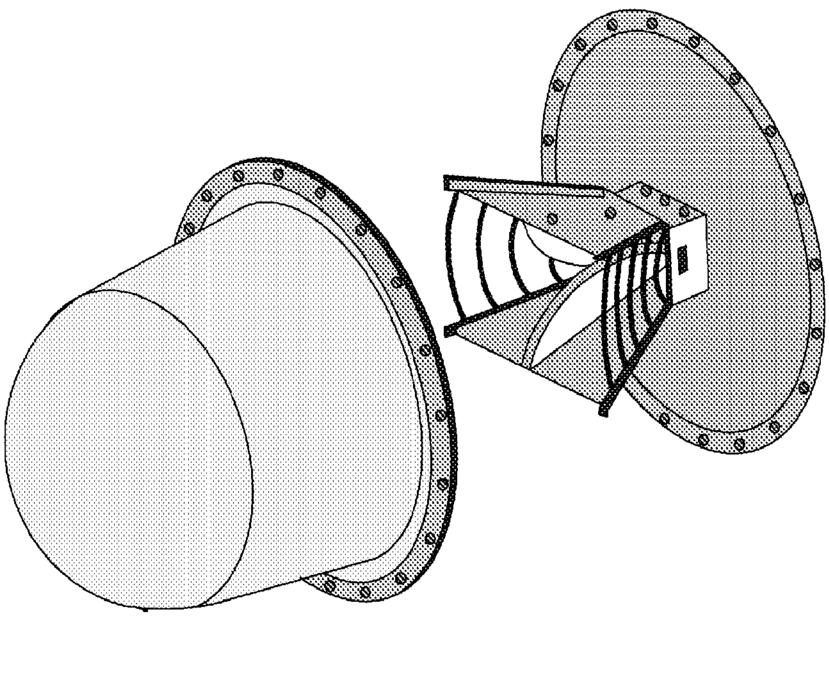
FIG. 14 shows an example fixed antenna that can employ a radome comprising electromagnetic metastructure cores in accordance with an illustrative embodiment.

FIG. 14 shows an example fixed antenna that can employ a radome comprising electromagnetic metastructure cores in accordance with an illustrative embodiment.

DISCUSSION

The instant 3D FSS may be used to create a structural electromagnetic composite that can exhibit superior size, weight, power (SWaP) capabilities. The instant 3D FSS can also be used to provide wide system bandwidth, tunable (static) electromagnetic characteristics, tunable (in situ) electromagnetic characteristics, as well as integrated with non-standard material systems. In some embodiments, the instant 3D FSS may be used to create subreflectors with extended bandwidth capabilities, e.g., for 5G applications, among others.

Published literature surveyed on the topic of electromagnetic metastructures generally breaks into either one of two categories: 1) electromagnetic responses or 2) structural response. These two categories are not generally combined nor use a 3D unit cell architecture for a structural core.

Ref [1] covers a variety of dielectric stack-ups for traditional radomes in which cores are low-loss dielectric constant materials that are used for structural rigidity.

Ref [2] disclose a hybrid radome where metalized arrays are integrated into the outer dielectric skin of the structural RF composite. The core appears to be purely structural.

Refs. [2]-[5] discloses 3D frequency-selective structures that are not part of a structural composite.

Ref [6] employs material having wideband negative permeability that is sealed in a container.

It should be appreciated that any of the components or modules referred to with regards to any of the present embodiments discussed herein may be integrally or separately formed with one another. Further, redundant functions or structures of the components or modules may be implemented. Moreover, the various components may be communicated locally and/or remotely with any user/clinician/patient or machine/system/computer/processor.

Moreover, the various components may be in communication via wireless and/or hardwire or other desirable and available communication means, systems, and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications, and publications as listed below and throughout this document are hereby incorporated by reference in their entirety herein.

[1] Molero, C., E. Menargues, and M. García-Vigueras. "All-metal 3-D Frequency Selective Surface with Versatile Dual-Band Polarization Conversion." IEEE Transactions on Antennas and Propagation (2020).

[2] Li, Bo, and Zhongxiang Shen. "Wideband 3D frequency selective rasorber." IEEE Transactions on Antennas and Propagation 62.12 (2014): 6536-6541.

[3] Li, Bo, and Zhongxiang Shen. "Angular-stable and polarization-independent frequency selective structure with high selectivity." Applied Physics Letters 103.17 (2013): 171607.

[4] Shen, Zhongxiang, Jiang Wang, and Bo Li. "3-D frequency selective rasorber: concept, analysis, and design." IEEE Transactions on Microwave Theory and Techniques 64.10 (2016): 3087-3096.

[5] Zhang, Yixiong, et al. "Frequency selective rasorber with low insertion loss and dual-band absorptions using planar slotline structures." IEEE Antennas and Wireless Propagation Letters 17.4 (2018): 633-636.

[6] Archambeault, Bruce, and Samuel Connor. "Electromagnetic shield using meta-material." U.S. patent application Ser. No. 10/842,268.

[7] Kozakoff, Dennis J. Analysis of radome-enclosed antennas. Artech House, 2010.

[8] Munk, Ben A. Frequency selective surfaces: theory and design. John Wiley & Sons, 2005.

What is claimed is:

1. A radome panel structure comprising:

a substrate formed of a dielectric material, the substrate having a surface that forms a radome outward-facing skin for a radome; and one or more wall dielectric metastructure structures fixably coupled to the substrate, including a first wall dielectric metastructure structure, the first wall dielectric metastructure structure having a non-parallel coupling to the substrate that extends one side of the first wall dielectric metastructure structure away from the substrate, the first wall dielectric structure comprising a conductive layer having a pattern formed thereon to provide three-dimensional frequency selectivity to RF waves that traverse across the radome panel structure.

2. The radome panel structure of claim 1, wherein the pattern forms electrical routing paths that connect to at least one of a magnetic composite and/or resistive film to provide the three-dimensional frequency selectivity to the RF waves.

3. The radome panel structure of claim 1, wherein the pattern forms a resonator.

4. The radome panel structure of claim 1, having at least a first side, a second side, and a third side, wherein the first side has a first set of interconnects to connect to a second radome panel structure, the second side has a second set of interconnects to connect to a third radome panel structure, and the third side has a third set of interconnects to connect to a fourth radome panel structure, and wherein the radome panel structure, the second radome panel structure, the third radome panel structure, and the fourth radome panel structure collectively form a planar array having a plane having a surface normal that is parallel to a travel direction of the RF waves.

5. The radome panel structure of claim 4, further having a fourth side, wherein the fourth side has a fourth set of interconnects to connect to a fifth radome panel structure.

6. The radome panel structure of claim 4, wherein the radome panel structure, the second radome panel structure, the third radome panel structure, and the fourth radome panel structure collectively define an integrated space in the radome, wherein the integrated space is filled with a material to improve the frequency selectivity characteristics or mechanical properties of the integrated space.

7. The radome panel structure of claim 1, further comprising:

a second-layer substrate formed of a dielectric material, the second-layer substrate comprising a conductive layer having a second pattern formed thereon to further provide the three-dimensional (3D) frequency selectivity to the RF waves that traverse across the radome panel structure.

8. The radome panel structure of claim 1, further comprising:

a second-layer substrate formed of a dielectric material, the second-layer substrate having a surface that is fixably coupled to the one or more wall dielectric metastructure structures, including to the first wall dielectric metastructure structure; and one or more second-layer wall dielectric metastructure structures fixably coupled to the second-layer substrate, including a first second-layer wall dielectric metastructure structure, the first second-layer wall dielectric metastructure structure having a non-parallel coupling to the second-layer substrate that extends one side of the first second-layer wall dielectric metastructure structure away from the second-substrate substrate, the first second-layer wall dielectric structure comprising a conductive layer having a third pattern formed thereon to further provide the three-dimensional frequency selectivity to the RF waves that traverse across the radome panel structure.

9. The radome panel structure of claim 8, wherein the second-layer substrate comprises a conductive layer having a second pattern formed thereon to further provide the three-dimensional frequency selectivity to the RF waves that traverse across the radome panel structure.

10. The radome panel structure of claim 1, wherein the pattern is configured to provide three-dimensional frequency selectivity (FSS) characteristics that reflect or polarize certain EMI waves.

11. The radome panel structure of claim 10, wherein the three-dimensional frequency selectivity (FSS) characteristics are defined by a periodicity parameter of a lattice formed by the one or more wall dielectric metastructure structures.

12. The radome panel structure of claim 1, wherein the pattern are coupled to electrical switch matrices, Schottky diodes, phase change materials, or other components to induce an electric flow from the RF wave, wherein the first wall dielectric metastructure structure is configured to increase its reflective properties to the RF wave with the electric flow.

13. The radome panel structure of claim 1, wherein the substrate is substantially flat.

14. The radome panel structure of claim 1, wherein the substrate is curved.

15. The radome panel structure of claim 1, further comprising:

a second structure comprising a dielectric material that forms an inward-facing skin for the radome structure.

16. A radome comprising:

a plurality of radome panel structures each comprising:

a substrate formed of a dielectric material, the substrate having a surface that forms a radome outward-facing skin for the radome; and one or more wall dielectric metastructure structures fixably coupled to the substrate, including a first wall dielectric metastructure structure, the first wall dielectric metastructure structure having a non-parallel coupling to the substrate that extends one side of the first wall dielectric metastructure structure away from the substrate, the first wall dielectric structure comprising a conductive layer having a pattern formed thereon to provide three-dimensional frequency selectivity to RF waves that traverse across the radome panel structure.

17. The radome of claim 16, wherein the radome is configured to be mounted to a vehicle or a building.

18. The radome of claim 16, wherein the radome is configured as a shuttered radome, non-reciprocal radome, a frequency tunable spatial filter radome, a wideband reconfigurable planar antenna radome, and a reconfigurable surface wave antennas radome.

19. The radome of claim 16 any one of claims 16-18, wherein the first wall dielectric metastructure structure is fabricated as a printed circuit board or fabricated using additive manufacturing fabrication.

20. A method of fabricating a radome, the method comprising:

connecting a plurality of radome panel structures to form a radome, wherein each of the plurality of radome panel structure comprises:

a substrate formed of a dielectric material, the substrate having a surface that forms a radome outward-facing skin for a radome; and one or more wall dielectric metastructure structures fixably coupled to the substrate, including a first wall dielectric metastructure structure, the first wall dielectric metastructure structure having a non-parallel coupling to the substrate that extends one side of the first wall dielectric metastructure structure away from the substrate, the first wall dielectric structure comprising a conductive layer having a pattern formed thereon to provide three-dimensional frequency selectivity to RF waves that traverses across the radome panel structure.

* * * * *